(12) United States Patent
Tseng

(10) Patent No.: US 9,264,149 B2
(45) Date of Patent: Feb. 16, 2016

(54) OPTICAL COMMUNICATION DEVICE WITH A CONTROLLER

(71) Applicant: HON HAI PRECISION INDUSTRY CO., LTD., New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 89 days.

(21) Appl. No.: 14/144,571

(22) Filed: Dec. 31, 2013

(65) Prior Publication Data

US 2015/0014555 A1   Jan. 15, 2015

(30) Foreign Application Priority Data

Jul. 15, 2013   (TW) .................................. 102125138

(51) Int. Cl.
*H04B 10/00* (2013.01)
*H04B 10/80* (2013.01)

(52) U.S. Cl.
CPC .................................... *H04B 10/801* (2013.01)

(58) Field of Classification Search
CPC ...... G02B 6/12; G02B 6/4207; G02B 6/4214; G02B 6/428; G02B 6/43
See application file for complete search history.

(56) References Cited

U.S. PATENT DOCUMENTS

2013/0330035 A1* 12/2013 Shin et al. ........................ 385/14

* cited by examiner

*Primary Examiner* — Tony Ko
(74) *Attorney, Agent, or Firm* — Novak Druce Connolly Bove + Quigg LLP

(57) ABSTRACT

An optical communication device includes a light emitting element including a light emitting surface, a first substrate coating the light emitting element, a light receiving element including a light receiving surface, a second substrate coating the light receiving element, a planar optical waveguide, a first reflecting element including a first sloped surface, and a second reflecting element including a second sloped surface. The first substrate includes a first supporting surface. The first supporting surface defines a first light guiding hole spatially corresponding to the light emitting surface. The second substrate includes a second supporting surface. The second supporting surface defines a second light guiding hole spatially corresponding to the light receiving surface. The planar optical waveguide is positioned on the first supporting surface and the second supporting surface. The first reflecting element and the second reflecting element are respectively positioned on two opposite ends of the planar optical waveguide.

15 Claims, 1 Drawing Sheet

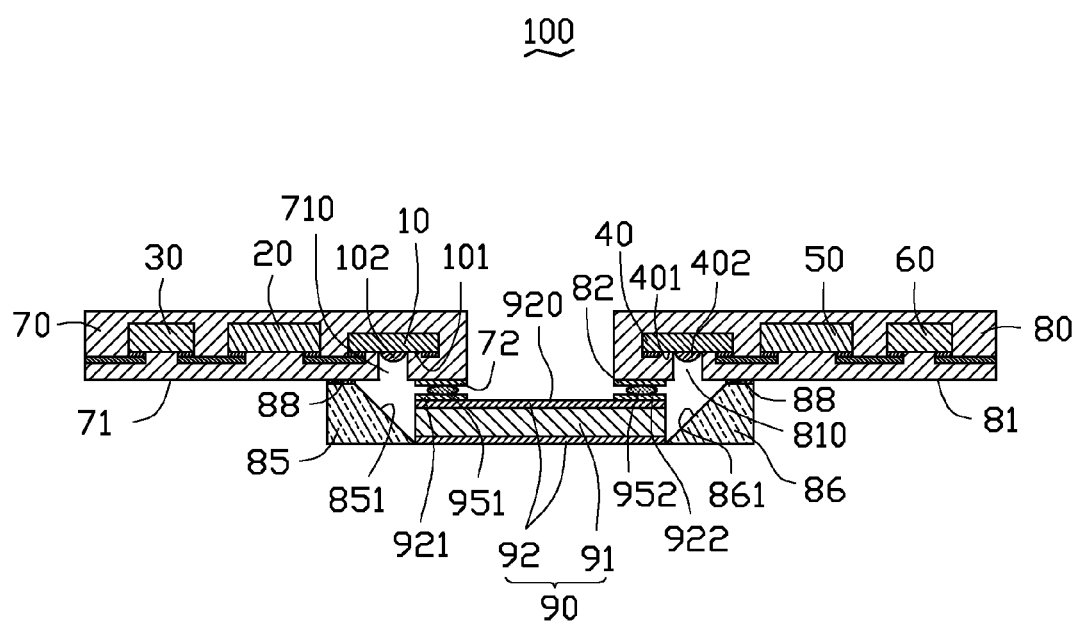

OPTICAL COMMUNICATION DEVICE WITH A CONTROLLER

BACKGROUND

1. Technical Field

The present disclosure relates to an optical communication device.

2. Description of Related Art

An optical communication device includes a photoelectric element for emitting/receiving optical signals, a driver chip for driving the photoelectric element, a planar light waveguide for transmitting optical signals, and a lens element for optically coupling the photoelectric element with the light waveguide. To ensure an optical transmitting efficiency of the optical communication device, the photoelectric element and the light waveguide need to be accurately aligned with the lens element. However, a complicated alignment mechanism and method is needed to align the photoelectric element and the light waveguide with the lens element, which increases a cost and assembling difficulty of the optical communication device.

Therefore, it is desirable to provide an optical communication device which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The FIGURE is a schematic view of an optical communication device, according to an exemplary embodiment of the present disclosure.

DETAILED DESCRIPTION

The FIGURE shows an optical communication device 100, according to an exemplary embodiment. The optical communication device 100 includes a light emitting element 10, a first controller 20, a processor 30, a light receiving element 40, a second controller 50, a storing element 60, a first substrate 70, a second substrate 80, a planar optical waveguide 90, a first reflecting element 85, and a second reflecting element 86.

The light emitting element 10 includes a light emitting surface 101 and a first light condensing lens 102 formed on the light emitting surface 101. In the embodiment, the light emitting element 10 is a laser diode (LD). In the embodiment, the first light condensing lens 102 is a convex lens.

The first controller 20 is located between the light emitting element 10 and the processor 30, and electrically connected to the light emitting element 10 and electrically connected to the processor 30.

The first substrate 70 is made of rubber. The light emitting element 10, the first controller 20, and the processor 30 are buried in the first substrate 70 by an injection molding method. The first substrate 70 includes a first supporting surface 71. The first supporting surface 71 defines a first light guiding hole 710. The first light guiding hole 710 spatially corresponds to the light emitting element 10, with the first light condensing lens 102 being received in the first light guiding hole 710. The first substrate 70 includes a first connection pad 72 formed on the first supporting surface 71.

The light receiving element 40 includes a light receiving surface 401 and a second light condensing lens 402 formed on the light receiving surface 401. In the embodiment, the light receiving element 40 is a photo diode (PD). The second light condensing lens 402 is also a convex lens.

The second controller 50 is located between the light receiving element 40 and the storing element 60, and electrically connected to the light receiving element 40 and electrically connected to the storing element 60. In the embodiment, the storing element 60 is a flash memory.

The second substrate 80 is also made of rubber. The light receiving element 40, the second controller 50, and the storing element 60 are buried in the second substrate 80 by an injection molding method. The second substrate 80 includes a second supporting surface 81. The second supporting surface 81 defines a second light guiding hole 810. The second light guiding hole 810 spatially corresponds to the light receiving element 40, with the second light condensing lens 402 being received in the second light guiding hole 810. The second substrate 80 includes a second connection pad 82 formed on the second supporting surface 81. The second substrate 80 is opposite to the first substrate 70. The second connection pad 82 is close to the first substrate 70.

The planar optical waveguide 90 includes a light guiding portion 91 and a coating element 92 coating the light guiding portion 91. In the embodiment, the coating element 92 is made of optical fiber cladding materials. The coating element 92 includes a first surface 920 facing the first substrate 70 and facing the second substrate 80. The planar optical waveguide 90 also includes a third connection pad 921 formed on the first surface 920 and a fourth connection pad 922 formed on the first surface 920. The third connection pad 921 spatially corresponds to the first connection pad 72. The third connection pad 921 is connected to the first connection pad 72 through a first pad ball 951. The fourth connection pad 922 spatially corresponds to the second connection pad 82. The fourth connection pad 922 is connected to the second connection pad 82 through a second pad ball 952.

The first reflecting element 85 and the second reflecting element 86 are respectively positioned on two opposite ends of the planar optical waveguide 90. In particular, the first reflecting element 85 includes a first sloped surface 851 facing the light emitting surface 101, and facing the planar optical waveguide 90. The first reflecting element 85 is positioned on the first supporting surface 71 through an adhesive 88, with the first sloped surface 851 aligning with the first light condensing lens 102, and also aligning with the light guiding portion 91. In the embodiment, an included angle between an optical axis of the first light condensing lens 102 and the first sloped surface 851 is about 45 degrees, and an included angle between an optical axis of the light guiding portion 91 and the first sloped surface 851 is also about 45 degrees.

The second reflecting element 86 includes a second sloped surface 861 facing the light receiving surface 401, and facing the planar optical waveguide 90. The second reflecting element 86 is positioned on the second supporting surface 81 also through the adhesive 88, with the second sloped surface 861 aligning with the second light condensing lens 402, and also aligning with the light guiding portion 91. In the embodiment, an included angle between an optical axis of the second light condensing lens 402 and the second sloped surface 861 is also about 45 degrees, and an included angle between the optical axis of the light guiding portion 91 and the second sloped surface 861 is also about 45 degrees.

In use, the processor 30 sends a trigger signal to the first controller 20. The first controller 20 receives the trigger signal and generates a driving signal to drive the light emitting element 10 to emit light beams. The light beams emitted by the light emitting element 10 are condensed by the light condensing lens 102, and are directed onto the first sloped surface 851. The first sloped surface 851 bends the light beams about 90 degrees, so that the light beams enter into the light guiding portion 91 of the planar optical waveguide 90. The light beams reflect off the second sloped surface 861 and is bent 90 degrees onto the light receiving element 40. The light receiving element 40 converts light signals received by the second light condensing lens 402 into electrical signals, and transmits the electrical signals to the second controller 50. The second controller 50 amplifies the electrical signals. The storing element 60 stores the amplified electrical signals.

In other embodiments, both the first light condensing lens 102 and the second light condensing lens 402 can be omitted if the light is not required to be condensed.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical communication device, comprising:
   a light emitting element comprising a light emitting surface;
   a first substrate receiving the light emitting element therein, the first substrate comprising a first supporting surface, the first supporting surface defining a first light guiding hole spatially corresponding to the light emitting surface;
   a light receiving element comprising a light receiving surface;
   a second substrate receiving the light receiving element therein, the second substrate comprising a second supporting surface, the second supporting surface defining a second light guiding hole spatially corresponding to the light receiving surface;
   a planar optical waveguide positioned on the first supporting surface and the second supporting surface;
   a processor;
   a first controller, the first controller being located between the light emitting element and the processor, the first controller being electrically connected to the light emitting element and electrically connected to the processor; and
   a first reflecting element and a second reflecting element respectively positioned on two opposite ends of the planar optical waveguide, the first reflecting element comprising a first sloped surface, the first reflecting element positioned on the first supporting surface, with the first sloped surface aligning with the light emitting surface and the planar optical waveguide, the second reflecting element comprising a second sloped surface, the second reflecting element positioned on the second supporting surface, with the second sloped surface aligning with the light receiving surface and the planar optical waveguide.

2. The optical communication device of claim 1, wherein the first substrate is made of rubber, all of the light emitting element, the first controller, and the processor are buried in the first substrate by an injection molding method.

3. The optical communication device of claim 1, wherein the first substrate comprises a first connection pad formed on the first supporting surface, the second substrate comprises a second connection pad formed on the second supporting surface, the planar optical waveguide comprises a third connection pad, a fourth connection pad, and a first surface facing the first substrate and facing the second substrate, the third connection pad and the fourth connection pad are formed on the first surface, the third connection pad is electrically connected to the first connection pad, the fourth connection pad is electrically connected to the second connection pad.

4. The optical communication device of claim 3, comprising a first pad ball, wherein the third connection pad is connected to the first connection pad through the first pad ball.

5. The optical communication device of claim 3, comprising a second pad ball, wherein the fourth connection pad is connected to the second connection pad through the second pad ball.

6. The optical communication device of claim 1, comprising a storing element and a second controller, wherein the second controller is located between the light receiving element and the storing element, the second controller is electrically connected to the light receiving element and electrically connected to the storing element.

7. The optical communication device of claim 6, wherein the second substrate is made of rubber, all of the light receiving element, the second controller, and the storing element are buried in the second substrate by an injection molding method.

8. The optical communication device of claim 6, wherein the storing element is a flash memory.

9. The optical communication device of claim 1, comprising an adhesive, wherein the first reflecting element is positioned on the first supporting surface through the adhesive.

10. The optical communication device of claim 9, wherein the second reflecting element is positioned on the second supporting surface through the adhesive.

11. The optical communication device of claim 1, wherein the light emitting element comprises a first light condensing lens formed on the light emitting surface, the first sloped surface aligns with the first light condensing lens, the light receiving element comprises a second light condensing lens formed on the light receiving surface, the second sloped surface aligns with the second light condensing lens.

12. The optical communication device of claim 11, wherein the planar optical waveguide comprises a light guiding portion and a coating element, the coating element coats the light guiding portion, an included angle between an optical axis of the first light condensing lens and the first sloped surface is about 45 degrees, an included angle between an optical axis of the light guiding portion and the first sloped surface is also about 45 degrees, an included angle between an optical axis of the second light condensing lens and the second sloped surface is about 45 degrees, and an included angle between an optical axis of the light guiding portion and the second sloped surface is also about 45 degrees.

13. The optical communication device of claim 12, wherein the coating element is made of optical fiber cladding material.

14. The optical communication device of claim 11, wherein both the first light condensing lens and the second light condensing lens are convex lenses.

15. The optical communication device of claim 1, wherein the light emitting element is a laser diode, and the light receiving element is a photo diode.

* * * * *